United States Patent
Yang et al.

(10) Patent No.: US 10,312,501 B2
(45) Date of Patent: Jun. 4, 2019

(54) ELECTROLYTE AND NEGATIVE ELECTRODE STRUCTURE

(71) Applicant: GM GLOBAL TECHNOLOGY OPERATIONS LLC, Detroit, MI (US)

(72) Inventors: Li Yang, Troy, MI (US); Mei Cai, Bloomfield Hills, MI (US); Fang Dai, Troy, MI (US); Qiangfeng Xiao, Troy, MI (US); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 227 days.

(21) Appl. No.: 14/954,181

(22) Filed: Nov. 30, 2015

(65) Prior Publication Data

US 2016/0172681 A1 Jun. 16, 2016

Related U.S. Application Data

(60) Provisional application No. 62/090,192, filed on Dec. 10, 2014.

(51) Int. Cl.
*H01M 4/04* (2006.01)
*H01M 10/0568* (2010.01)
(Continued)

(52) U.S. Cl.
CPC ........ *H01M 4/0452* (2013.01); *H01M 4/134* (2013.01); *H01M 4/1395* (2013.01); *H01M 4/366* (2013.01); *H01M 10/052* (2013.01); *H01M 10/0562* (2013.01); *H01M 10/0567* (2013.01); *H01M 10/0568* (2013.01);
(Continued)

(58) Field of Classification Search
CPC .................................................. H01M 10/056
See application file for complete search history.

(56) References Cited

U.S. PATENT DOCUMENTS 7,018,607 B2   3/2006 Nazri et al.
7,208,248 B2   4/2007 Hayashi et al.
(Continued)

FOREIGN PATENT DOCUMENTS

CN   1328355 A   12/2001
CN   1774826 A   5/2006
(Continued)

OTHER PUBLICATIONS

Chung, Kwang-il et al.; "Lithium Phosphorous Oxynitride as a Passive Layer for Anodes in Lithium Secondary Batteries"; Journal of Electroanalytical Chemistry 566 (2004); pp. 263-267.
(Continued)

*Primary Examiner* — Barbara L Gilliam
*Assistant Examiner* — Nathanael T Zemui
(74) *Attorney, Agent, or Firm* — Harness, Dickey & Pierce, P.L.C.

(57) ABSTRACT

An example electrolyte includes a solvent, a lithium salt, and an additive selected from the group consisting of a silane with at least one Si—H group; a fluorinated methoxysilane; a fluorinated chlorosilane; and combinations thereof. The electrolyte may be used in a method for making a solid electrolyte interface (SEI) layer on a surface of a lithium electrode. A negative electrode structure may be formed from the method.

14 Claims, 1 Drawing Sheet

(51) Int. Cl.
  *H01M 4/134* (2010.01)
  *H01M 4/1395* (2010.01)
  *H01M 10/0567* (2010.01)
  *H01M 10/0569* (2010.01)
  *H01M 4/36* (2006.01)
  *H01M 10/052* (2010.01)
  *H01M 10/0562* (2010.01)

(52) U.S. Cl.
  CPC .... *H01M 10/0569* (2013.01); *H01M 2220/20* (2013.01); *H01M 2220/30* (2013.01); *H01M 2300/0028* (2013.01); *H01M 2300/0037* (2013.01); *Y02E 60/122* (2013.01)

(56) References Cited

U.S. PATENT DOCUMENTS

| | | |
|---|---|---|
| 7,736,805 B2 | 6/2010 | Nazri et al. |
| 8,101,152 B1 | 1/2012 | Halalay et al. |
| 8,148,455 B2 | 4/2012 | Posudievsky et al. |
| 8,383,273 B2 | 2/2013 | Machida et al. |
| 8,399,138 B2 | 3/2013 | Timmons |
| 8,420,259 B2 | 4/2013 | Xiao et al. |
| 8,440,350 B1 | 5/2013 | Verbrugge et al. |
| 8,568,930 B2 | 10/2013 | Halalay et al. |
| 8,642,201 B2 | 2/2014 | Cheng et al. |
| 8,647,779 B2 | 2/2014 | Machida et al. |
| 8,658,295 B2 | 2/2014 | Cheng et al. |
| 8,663,840 B2 | 3/2014 | Nazri et al. |
| 8,679,680 B2 | 3/2014 | Vanimisetti et al. |
| 8,785,054 B2 | 7/2014 | Halalay et al. |
| 8,828,481 B2 | 9/2014 | Burton et al. |
| 8,835,056 B2 | 9/2014 | Xiao et al. |
| 8,974,946 B2 | 3/2015 | Cai et al. |
| 8,999,584 B2 | 4/2015 | Jiang et al. |
| 9,012,075 B2 | 4/2015 | Verbrugge et al. |
| 9,023,520 B2 | 5/2015 | Halalay et al. |
| 9,028,565 B2 | 5/2015 | Huang |
| 9,077,038 B2 | 7/2015 | Halalay et al. |
| 9,093,705 B2 | 7/2015 | Xiao et al. |
| 9,123,939 B2 | 9/2015 | Xiao et al. |
| 9,142,830 B2 | 9/2015 | Xiao et al. |
| 9,153,819 B2 | 10/2015 | Huang et al. |
| 9,160,036 B2 | 10/2015 | Yang et al. |
| 9,252,411 B2 | 2/2016 | Abd Elhamid et al. |
| 9,281,515 B2 | 3/2016 | Nazri |
| 9,302,914 B2 | 4/2016 | Liu et al. |
| 9,337,512 B2 | 5/2016 | An et al. |
| 9,350,046 B2 | 5/2016 | Huang |
| 9,356,281 B2 | 5/2016 | Verbrugge et al. |
| 9,362,551 B2 | 6/2016 | Sachdev et al. |
| 9,362,552 B2 | 6/2016 | Sohn et al. |
| 9,362,560 B2 | 6/2016 | Nazri |
| 9,412,986 B2 | 8/2016 | Huang |
| 9,437,871 B2 | 9/2016 | Zhou et al. |
| 9,520,594 B2 | 12/2016 | Neumann et al. |
| 9,537,144 B2 | 1/2017 | Huang et al. |
| 9,583,767 B2 | 2/2017 | Verbrugge et al. |
| 9,647,254 B2 | 5/2017 | Dadheech et al. |
| 9,742,028 B2 | 8/2017 | Zhou et al. |
| 9,786,906 B2 | 10/2017 | Yang et al. |
| 2002/0012850 A1 | 1/2002 | Schmidt et al. |
| 2003/0003361 A1 | 1/2003 | Sunagawa et al. |
| 2005/0276910 A1 | 12/2005 | Gupta |
| 2006/0147799 A1 | 7/2006 | Hayashi et al. |
| 2007/0195448 A1 | 8/2007 | Xie et al. |
| 2008/0186030 A1 | 8/2008 | Kasamatsu et al. |
| 2008/0245553 A1 | 10/2008 | Sakai et al. |
| 2011/0027650 A1 | 2/2011 | Yamamoto et al. |
| 2012/0100403 A1 | 4/2012 | Wang et al. |
| 2012/0175551 A1 | 7/2012 | Watanabe et al. |
| 2012/0229096 A1 | 9/2012 | Nazri |
| 2012/0231321 A1 | 9/2012 | Huang et al. |
| 2012/0328927 A1 | 12/2012 | Timmons et al. |
| 2013/0078517 A1 | 3/2013 | Shon et al. |
| 2013/0099159 A1 | 4/2013 | Halalay et al. |
| 2013/0136997 A1* | 5/2013 | An .................... H01M 10/0567 429/302 |
| 2013/0284338 A1 | 10/2013 | Xiao et al. |
| 2014/0272526 A1 | 9/2014 | Huang |
| 2014/0272558 A1 | 9/2014 | Xiao et al. |
| 2014/0342244 A1* | 11/2014 | West .................. H01M 10/0569 429/333 |
| 2015/0014890 A1 | 1/2015 | Xiao |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2015/0056517 A1 | 2/2015 | Zhou et al. |
| 2015/0147662 A1* | 5/2015 | Park .................. H01M 10/0568 429/332 |
| 2015/0162583 A1 | 6/2015 | Dadheech et al. |
| 2015/0162602 A1 | 6/2015 | Dadheech et al. |
| 2015/0203516 A1* | 7/2015 | Zhang .................... C07F 7/184 556/423 |
| 2015/0236324 A1 | 8/2015 | Xiao et al. |
| 2015/0349307 A1 | 12/2015 | Dadheech et al. |
| 2016/0020491 A1 | 1/2016 | Dai et al. |
| 2016/0111721 A1 | 4/2016 | Xiao et al. |
| 2016/0141598 A1 | 5/2016 | Dai et al. |
| 2016/0172665 A1 | 6/2016 | Zhou et al. |
| 2016/0172681 A1 | 6/2016 | Yang et al. |
| 2016/0172706 A1 | 6/2016 | Xiao et al. |
| 2016/0172710 A1 | 6/2016 | Liu et al. |
| 2016/0218342 A1 | 7/2016 | Xiao et al. |
| 2016/0254567 A1 | 9/2016 | Cai et al. |
| 2017/0141382 A1 | 5/2017 | Dadheech et al. |
| 2017/0141383 A1 | 5/2017 | Dadheech et al. |
| 2017/0162859 A1 | 6/2017 | Yang et al. |
| 2017/0214079 A1 | 7/2017 | Dai et al. |
| 2017/0222210 A1 | 8/2017 | Xiao |
| 2017/0271678 A1 | 9/2017 | Yang et al. |
| 2017/0288230 A1 | 10/2017 | Yang et al. |
| 2017/0327948 A1 | 11/2017 | Dadheech et al. |
| 2017/0338490 A1 | 11/2017 | Xiao et al. |

FOREIGN PATENT DOCUMENTS

| | | |
|---|---|---|
| CN | 101471455 A | 7/2009 |
| CN | 101872872 A | 10/2010 |
| CN | 103038930 A | 4/2013 |
| CN | 103050667 A | 4/2013 |
| CN | 104282885 A | 1/2015 |
| CN | 105703005 A | 6/2016 |
| CN | 105703006 A | 6/2016 |
| DE | 102014109441 A1 | 1/2015 |
| DE | 102015121310 A1 | 6/2016 |
| DE | 102015121342 A1 | 6/2016 |
| EP | 2573841 A1 | 3/2013 |
| KR | 1020120080831 A | 7/2012 |
| TW | 201305085 A | 2/2013 |
| WO | WO-2008/128726 A1 | 10/2008 |
| WO | WO-2014059709 A1 * | 4/2014 ............. C07F 7/184 |
| WO | WO-2014182281 A1 | 11/2014 |
| WO | WO-2015126649 A1 | 8/2015 |

OTHER PUBLICATIONS

Fang Liu et al.; U.S. Appl. No. 15/666,170, filed Aug. 1, 2017 entitled "Conformal Coating of Lithium Anode Via Vapor Deposition for Rechargeable Lithium Ion Batteries"; 52 pages.

J. G. Zhang et al.; "Lithium Metal Anodes and Rechargeable Lithium Metal Batteries"; Chapter 2, Characterization and Modeling of Lithium Dendrite Growth; Springer Series in Materials Science 249, DOI 10.1007/978-3-319-44054-5_2; Springer International Publishing Switzerland 2017; 40 pages.

Kozen, Alexander C. et al.; "Next-Generation Lithium Metal Anode Engineering Via Atomic Layer Deposition"; ACS Nano; vol. 9; No. 6; May 13, 2015; pp. 5884-5892.

Li Yang et al.; U.S. Appl. No. 15/237,378, filed Aug. 15, 2016 entitled "Gel Electrolytes and Precursors Thereof"; 23 pages.

First Office Action for Chinese Patent Application No. 201410381733.4 dated Mar. 3, 2016 with English translation; 8 pages.

(56) References Cited

OTHER PUBLICATIONS

Second Office Action for Chinese Application No. 201410381733.4 dated Nov. 14, 2016 with English translation; 11 pages.
First Office Action for Chinese Application No. 201510910062.0 dated Sep. 29, 2017; 8 pages.
First Office Action for Chinese Application No. 201510910065.4 dated Oct. 26, 2017; 10 pages.

* cited by examiner

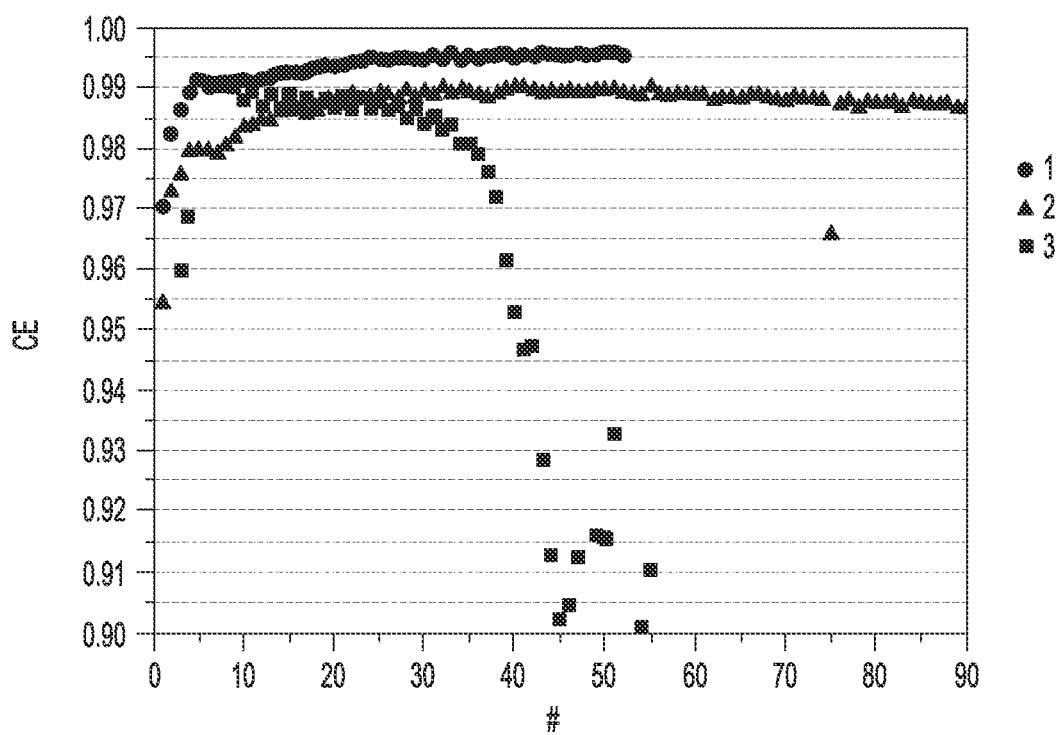

ELECTROLYTE AND NEGATIVE ELECTRODE STRUCTURE

CROSS-REFERENCE TO RELATED APPLICATIONS

This application claims the benefit of U.S. Provisional Application Ser. No. 62/090,192, filed Dec. 10, 2014, which is incorporated by reference herein in its entirety.

BACKGROUND

Secondary, or rechargeable, lithium ion batteries or lithium sulfur batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

An example electrolyte includes a solvent, a lithium salt, and an additive selected from the group consisting of a silane with at least one Si—H group; a fluorinated methoxysilane; a fluorinated chlorosilane; and combinations thereof. The electrolyte may be used in a method for making a solid electrolyte interface (SEI) layer on a surface of a lithium electrode. A negative electrode structure may be formed from the method.

BRIEF DESCRIPTION OF THE DRAWING

Features of examples of the present disclosure will become apparent by reference to the following detailed description and drawing.

FIG. 1 is a graph illustrating the Coulombic efficiency of a comparative example cell and two different example cells including different electrolytes disclosed herein.

DETAILED DESCRIPTION

Lithium-based batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. During charging, lithium ions are inserted (e.g., intercalated, alloyed, etc.) into the negative electrode, and during discharging, lithium ions are extracted from the negative electrode. Each of the electrodes is also associated with respective current collectors, which are connected by an interruptible external circuit that allows an electric current to pass between the negative and positive electrodes. Examples of lithium metal-based batteries include those that have a lithium metal negative electrode. The lithium metal negative electrode may be coupled with a sulfur based positive electrode in a lithium sulfur battery or with a traditional lithium-based positive electrode (e.g., $LiCoO_2$, $LiFePO_4$, $Li(Ni_xMn_yCo_z)O_2$ (NMC), etc.) in one example of a lithium ion battery.

Symmetrical lithium-lithium (Li—Li) electrochemical cells may be used to test the Coulombic efficiency of the lithium metal. It has been found that the lithium metal has a Coulombic efficiency around 99% in the symmetrical Li—Li cell when a traditional $LiNO_3$ based electrolyte is used. The efficiency is relatively low. In addition, any lithium metal-based battery will have a cycle life below 200 cycles if the negative to positive capacity ratio (N/P) is equal to 2, due, in part, to the fast loss of active lithium ions on the lithium metal side of the battery. To combat the loss of active lithium during cycling, large amounts of lithium may be used in the electrodes. However, additional lithium adds additional material to the battery, and thus increases the weight, cost, etc.

In the examples disclosed herein, a negative electrode structure is formed, which includes a solid electrolyte interphase (SEI) layer formed on a surface of a lithium negative electrode. The use of this negative electrode structure effectively improves the Coulombic efficiency of the lithium metal.

The SEI layer is formed from an additive that is present in an electrolyte solution. Since the additive is present in the electrolyte solution, the SEI layer is formed in situ when the lithium metal is placed into contact with the electrolyte. The formation of the SEI layer may take place within an electrochemical cell. As used herein, the electrochemical cell may refer to any of the lithium metal-based batteries previously mentioned. Other techniques, which do not require the use of an electrochemical cell, may also be used to form the SEI layer. This is due to the fact that the chemical reaction between the additive(s) and the lithium metal occur even in the absence of an applied voltage. Examples of the negative electrode structure formed via techniques that do not involve the electrochemical cell may then be incorporated into any example of the lithium metal-based battery.

The additives disclosed herein are silicon-based additives, which have a strong interaction with lithium metal negative electrodes. Without being bound to any theory, it is believed that the silicon-based additive tends to form a Si—O—Si based oligomer or polymer (i.e., the SEI layer) on the surface of the lithium metal negative electrode. The Si—O—Si based oligomer or polymer is flexible enough to accommodate the huge volume change of Li during cycling. For example, Si endures about a 350% volume change between Si and $Li_{3.75}Si$, while Li endures an infinite volume change if all the Li has been stripped from the current collector. In other words, pure Li metal has a volume, and when it is discharged there is no more solid, so the percent volume change (Vol_final−Vol_initial)/Vol_final is infinite. The Si—O—Si bond angle can change from 140° to 180° with an energy barrier of only 0.3 kcal/mol (the typical hydrogen bond is >5 kcal/mol, and the typical chemical bond >100 kcal/mol), which renders the Si—O—Si based oligomer/polymers flexible enough to resist the huge volume fluctuation. As such, the silicon-based additives disclosed herein and the SEI layer formed therefrom may be superior to other electrolyte additive and SEI layers.

Examples of the additive include a silane with at least one Si—H group, a fluorinated methoxysilane, a fluorinated chlorosilane, or combinations thereof.

Examples of the silane with at least one Si—H group include H—Si$((CH_2)_xCH_3)_2$—R, H—Si$((CH_2)_xCH_3)_2$—O—R, H—Si$((CH_2)_xCH_3)_2$—R-Anion$^-$Li$^+$, and H—Si$((CH_2)_xCH_3)_2$—O—R-Anion$^-$Li$^+$. In any of these formulas, x ranges from 0 to 2, and R is any element or organic group. Examples of suitable R elements include —Si, —C or —F.

Any organic group including —Si, —C or —F may also be used as R. One example of an organic group that is a suitable R group includes H—Si((CH$_2$)$_x$CH$_3$)$_2$—CH$_2$—CH$_2$—. An example of the additive with this R group is 1,1,4,4-tetramethyl-disilethane, with the structure:

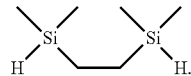

In the formulas H—Si((CH$_2$)$_x$CH$_3$)$_2$—R-Anion$^-$Li$^+$ and H—Si((CH$_2$)$_x$CH$_3$)$_2$—O—R-Anion$^-$Li$^+$, the anion may be any anion. Some example anions include PF$_5^-$, BF$_3^-$, bis(trifluoromethane sulfonyl)imide (TFSI$^-$), bis(fluorosulfonyl)imide (FSI$^-$), and fluorine-malonato(difluoro)borate ((F)MDFB$^-$). When fluorine-malonato(difluoro)borate ((F)MDFB$^-$) is used, the structure may be:

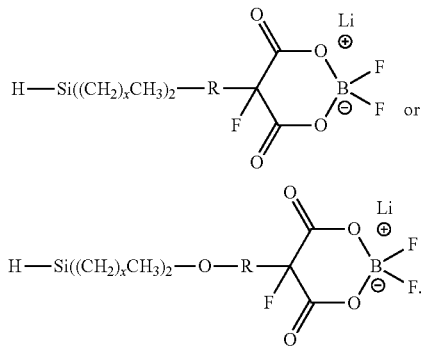

In these two examples, x ranges from 0 to 2 (as previously mentioned) and R may be any of the groups previously described. As an example R may be —(CH$_2$)$_2$—Si(CH$_2$)$_x$CH$_3$)$_2$—.

Examples of the fluorinated methoxysilane have the formula (CH$_3$O)$_2$RSi—(CH$_2$)$_x$—(CF$_2$)$_y$—CF$_3$, where R is —OCH$_3$ or —CH$_3$, x ranges from 0 to 2, and y ranges from 1 to 20. Some specific examples of the fluorinated methoxysilane include:

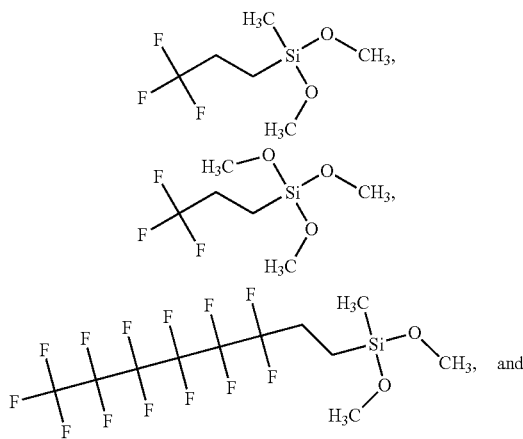

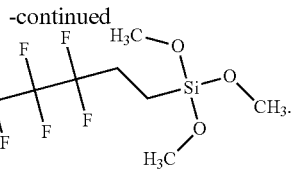

Examples of the fluorinated chlorosilane have the formula (CH$_3$)$_x$SiCl$_y$—(CH$_2$)$_m$—(CF$_2$)$_n$—CF$_3$, where x is 1 and y is 2 or x is 2 and y is 1, m ranges from 0 to 2, and n ranges from 1 to 20. Some specific examples of the fluorinated chlorosilane include:

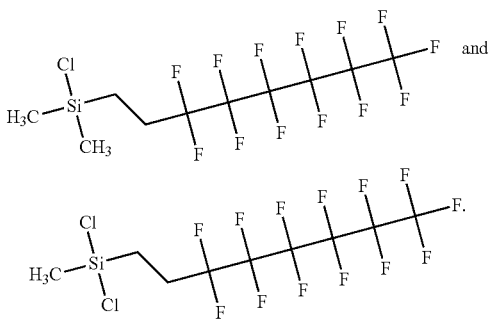

As mentioned herein, the additive(s) is(are) included in an electrolyte. The additive may be included in any suitable amount. As an example, the additive may be included in an amount ranging from about 0.1 wt % to about 10 wt % of a total wt % of the electrolyte.

The electrolyte also includes a solvent and a lithium salt. When the SEI layer is to be formed outside of the electrochemical cell, the electrolyte solvent may be selected from 1,3-dioxolane (DOL or DIOX), dimethoxyethane (DME), tetrahydrofuran, 2-methyltetrahydrofuran, 1,2-diethoxyethane, ethoxymethoxyethane, tetraethylene glycol dimethyl ether (TEGDME), polyethylene glycol dimethyl ether (PEGDME), cyclic carbonates (ethylene carbonate (EC), propylene carbonate, butylene carbonate, fluoroethylene carbonate), linear carbonates (dimethyl carbonate (DMC), diethyl carbonate (DEC), ethylmethyl carbonate (EMC)), aliphatic carboxylic esters (methyl formate, methyl acetate, methyl propionate), γ-lactones (γ-butyrolactone, γ-valerolactone), and mixtures thereof.

When the SEI layer is to be formed within the electrochemical cell, the selection of the solvent may vary, depending upon the type of electrochemical cell that is being used. If the cell is a Li—Li symmetrical electrochemical cell, any of the previously listed solvents may be used. If the cell is a Li—S electrochemical cell, the solvent may be selected from 1,3-dioxolane (DOL), dimethoxyethane (DME), tetrahydrofuran, 2-methyltetrahydrofuran, 1,2-diethoxyethane, ethoxymethoxyethane, tetraethylene glycol dimethyl ether (TEGDME), polyethylene glycol dimethyl ether (PEGDME), and mixtures thereof. If the cell is a lithium ion battery, the electrolyte solvent may be selected from cyclic carbonates (ethylene carbonate (EC), propylene carbonate, butylene carbonate, fluoroethylene carbonate), linear carbonates (dimethyl carbonate (DMC), diethyl carbonate (DEC), ethylmethyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), and mixtures thereof.

Examples of the lithium salt include $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI or lithium bis (trifluoromethylsulfonyl)imide), $LiPF_6$, $LiB(C_2O_4)_2$ (LiBOB), $LiBF_2(C_2O_4)$ (LiODFB), $LiPF_3(C_2F_5)_3$ (LiFAP), $LiPF_4(CF_3)_2$, $LiPF_4(C_2O_4)$ (LiFOP), $LiPF_3(CF_3)_3$, $LiSO_3CF_3$, $LiNO_3$, and mixtures thereof. In an example, the concentration of the salt in the electrolyte is about 1 mol/L.

The electrode upon which the SEI is formed is a lithium metal electrode. An example of the lithium metal electrode is lithium foil.

To form the SEI layer on the lithium metal outside of the electrochemical cell, any example of the electrolyte disclosed herein may be prepared, and then the lithium metal may be exposed to the electrolyte. When the SEI layer is formed on the lithium metal outside of the electrochemical cell, it is to be understood that the lithium salt may be excluded from the electrolyte. The exposure of the lithium metal to the electrolyte may be accomplished by dip-coating or some other suitable coating technique. The lithium metal is highly reactive, and is coated with a layer of LiOH. The H atom of the LiOH can react with various groups that may be attached to the Si of the additive so that the additive attaches to the lithium. As examples, the —H may react with H—Si to form $H_2$ and the Si will attach to the Li; the —H may react with $CH_3O$—Si to form methanol and the Si will attach to the Li; or the —H may react with Cl—Si to form HCl and the Si will attach to the Li. These attachments may be through the oxygen atoms. As such, the lithium metal and additive strongly interact (even without application of a voltage) to form the SEI layer on the surface of the lithium metal. In these examples, the lithium metal may be exposed to the electrolyte for a time that is sufficient for the chemical reaction between the additive and the groups at the surface of the lithium metal to take place. As an example, the exposure time may range from about 2 seconds to about 1 week.

The lithium metal structure formed via the previously described technique (i.e., outside of the electrochemical cell) includes the lithium metal and the SEI layer formed thereon. When formation of the SEI layer is complete, the lithium metal having the SEI layer formed thereon may be rinsed to remove any remaining electrolyte solution. This process forms the negative electrode structure that may subsequently be used as the negative electrode in any example of the lithium metal battery.

In the lithium metal battery, the negative electrode structure formed via the previously described technique may be coupled with a negative-side current collector and used with a traditional lithium-based positive electrode (e.g., $LiCoO_2$, NMC, $LiFePO_4$, etc.), or with a sulfur-based positive electrode, or with a mesoporous carbon positive electrode (which contains a metal catalyst). It is to be understood that since the SEI layer is already formed, the electrolyte used in these particular examples of the electrochemical cell/battery may or may not include the additive in the electrolyte.

To form the SEI layer on the lithium metal in situ within an electrochemical cell, any suitable electrochemical cell that includes lithium metal as the negative electrode is used. In the electrochemical cell fabrication process, the Si additive disclosed herein is added directly to the other electrolyte components (i.e., solvent and lithium salt) and is injected into the cell (e.g., a Li—$LiFePO_4$ cell, a Li—S cell, etc.).

Due to the highly reactive nature of the lithium metal, the SEI will form in situ within the cell on the surface of the lithium metal negative electrode, even in the absence of an applied voltage or load. During the cell/battery cycle, the additive reacts with the lithium at the exposed surface(s) of the lithium electrode to further form an example of the SEI layer. Without being bound to any theory, is believed that in this example, the silicon atoms of the additive bond to lithium metal through the oxygen atom (from LiOH) on the lithium electrode after the hydrogen atoms react with groups on the additive as described herein.

In the example of the lithium ion battery disclosed herein, the negative electrode is lithium metal and the lithium-based positive electrode may be any lithium-based active material that can sufficiently undergo lithium insertion and deinsertion with aluminum or another suitable current collector functioning as the positive terminal of the lithium ion battery. One common class of known lithium-based active materials suitable for this example of the positive electrode includes layered lithium transition metal oxides. For example, the lithium-based active material may be $LiNiO_2$, spinel lithium manganese oxide ($LiMn_2O_4$), lithium cobalt oxide ($LiCoO_2$), a manganese-nickel oxide spinel [$Li(Mn_{1.5}Ni_{0.5})O_2$], or a layered nickel-manganese-cobalt oxide (having a general formula of $xLi_2MnO_3 \cdot (1-x)LiMO_2$, where M is composed of any ratio of Ni, Mn and/or Co). A specific example of the layered nickel-manganese-cobalt oxide includes $(xLi_2MnO_3 \cdot (1-x)Li(Ni_{1/3}Mn_{1/3}Co_{1/3})O_2)$. Other suitable lithium-based active materials include $Li(Ni_{1/3}Mn_{1/3}Co_{1/3})O_2$, $Li_{x+y}Mn_{2-y}O_4$ (LMO, $0<x<1$ and $0<y<0.1$), or a lithium iron polyanion oxide, such as lithium iron phosphate (LiFePO4) or lithium iron fluorophosphate ($Li_2FePO_4F$), or a lithium rich layer-structure. Still other lithium based active materials may also be utilized, such as such as $LiNi_{1-x}Co_{1-y}M_{x+y}O_2$ or $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, where M is composed of any ratio of Al, Ti, Cr, and/or Mg), lithium nickel cobalt aluminum oxide (e.g., $LiNi_{0.8}Co_{0.15}Al_{0.05}O_2$ or NCA), aluminum stabilized lithium manganese oxide spinel (e.g., $Li_xAl_{0.05}Mn_{0.95}O_2$), lithium vanadium oxide ($LiV_2O_5$), $Li_2MSiO_4$ (where M is composed of any ratio of Co, Fe, and/or Mn), and any other high energy nickel-manganese-cobalt material (HE-NMC, NMC or $LiNiMnCoO_2$). By "any ratio" it is meant that any element may be present in any amount. So, in some examples, M could be Al, with or without Cr, Ti, and/or Mg, or any other combination of the listed elements. In another example, anion substitutions may be made in the lattice of any example of the lithium transition metal based active material to stabilize the crystal structure. For example, any O atom may be substituted with an F atom.

In the example of the lithium sulfur battery disclosed herein, the negative electrode is lithium metal, and the sulfur-based positive electrode is a sulfur-carbon composite. In an example, the weight ratio of S to C in the positive electrode ranges from 1:9 to 8:1.

It is to be understood that any of the positive electrodes disclosed herein may also include binder materials and conductive fillers. The binder material may be used to structurally hold the positive electrode active material together. Examples of the binder material include polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material. Other suitable binders include polyvinyl alcohol (PVA), sodium alginate, or other water-soluble binders. The conductive filler may be a conductive carbon material. The conductive carbon material may be a high surface area carbon, such as acetylene black (e.g., SUPER P® conductive carbon black from TIMCAL). The conductive filler material is included to ensure electron conduction between the active material and the positive-side current collector.

The lithium metal negative electrode is coupled with a negative-side current collector (e.g., copper) and the appropriate positive electrode for the particular electrochemical cell being used is coupled with a positive-side current collector (e.g., aluminum).

The separator separating the lithium metal negative electrode and the positive electrode may be any suitable porous polymer separator. The porous polymer separator may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous separators 16 include single layer polypropylene membranes, such as CELGARD 2400 and CELGARD 2500 from Celgard, LLC (Charlotte, N.C.). It is to be understood that the porous separator may be coated or treated, or uncoated or untreated. For example, the porous separator may or may not be coated or include any surfactant treatment thereon.

In other examples, the porous separator may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the porous separator is poly(p-hydroxybenzoic acid). In yet another example, the porous separator may be chosen from a combination of the polyolefin (such as PE and/or PP) and one or more of the other polymers listed above.

The porous separator may be a single layer or may be a multi-layer (e.g., bilayer, trilayer, etc.) laminate fabricated from either a dry or wet process. The porous separator operates as an electrical insulator (preventing the occurrence of a short), a mechanical support, and a barrier to prevent physical contact between the two electrodes. The porous separator also ensures passage of lithium ions through the electrolyte solution filling its pores.

In the electrochemical cell/battery, the lithium metal negative electrode, positive electrode, and the porous separator are soaked with the electrolyte disclosed herein, including the additive, the lithium salt, and the solvent that is appropriate for the type of cell/battery.

The battery/electrochemical cell also includes an external circuit and a load. The application of the load to the electrochemical cell closes the external circuit and connects the negative electrode and the positive electrode. The closed external circuit enables a working voltage to be applied across the electrochemical cell.

Upon the initial exposure of the electrodes to the electrolyte, the additive may begin to react with both of the lithium metal negative electrode to form the SEI layer. The SEI layer disclosed herein is a protective coating in that it protects the lithium metal negative electrode from additional reactions with the electrolyte. The SEI layer also exhibits uniformity (in composition and thickness) and adhesion to the lithium metal negative electrode.

To further illustrate the present disclosure, an example is given herein. It is to be understood that this example is provided for illustrative purposes and is not to be construed as limiting the scope of the present disclosure.

Example

Li—Li symmetric cells were prepared with lithium foil counter and copper working electrodes, by plating 1 mAh Li onto Cu. A comparative cell included a comparative electrolyte, which included 0.4M LiTFSI and 0.6M LiNO$_3$ in DME/DIOX (1:1 vol ratio). A first example cell included a first example electrolyte, which included 0.4M LiTFSI and 0.6M LiNO$_3$ in DME/DIOX (1:1 vol ratio) and 1% of 3,3,3-Trifluoropropylmethyldimethoxysilane

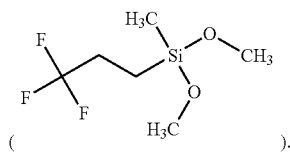

A second example cell included a second example electrolyte, which included 0.4M LiTFSI and 0.6M LiNO$_3$ in DME/DIOX (1:1 vol ratio) and 1% of a silylhydride related additive as listed in the scheme:

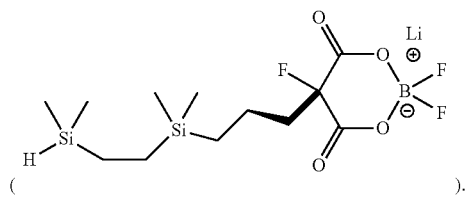

The test conditions for the comparative and example cells were: room temperature; current=250 µA; area=1.23 cm$^2$; electric charge=1 mA h; and 100% depth of discharge (DOD). The Coulombic efficiency results are shown in FIG. 1. In FIG. 1, the Y axis, labeled CE, represents the Coulombic efficiency (×100=percentage) and the X axis, labeled "#," represents the cycle number. As illustrated in FIG. 1, the comparative cell (labeled "3") had a cycling efficiency of about 98% to about 99% over 35 cycles. In contrast, with the addition of 3,3,3-Trifluoropropylmethyldimethoxysilane (first example cell, labeled "1"), the cycling efficiency was increased to about 99.6% and the cycle life was extended to about 50 cycles. Still further, with the addition of the silylhydride related additive (second example cell, labeled "2"), the cycling efficiency was increased to about 99% and the cycle life was extended to 90 cycles.

It is to be understood that the ranges provided herein include the stated range and any value or sub-range within the stated range. For example, a range of from about 0.1 wt % to about 10 wt % should be interpreted to include not only the explicitly recited limits of from about 0.1 wt % to about 10 wt %, but also to include individual values, such as 1.25 wt %, 5 wt %, etc., and sub-ranges, such as from about 2 wt % to about 8.5 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An electrolyte for forming a protective solid electrolyte interface layer on a surface of an electrode for an electrochemical cell, the electrolyte comprising:
   a solvent;
   a lithium salt; and
   an additive selected from the group consisting of a silane with at least one Si—H group; a fluorinated methoxysilane; a fluorinated chlorosilane; and combinations thereof,
   wherein the silane with at least one Si—H group is selected from the group consisting of H—Si(($CH_2$)$_x$ $CH_3$)$_2$—R-Anion$^-$ Li$^+$ and H—Si(($CH_2$)$_x$$CH_3$)$_2$—O—R-Anion$^-$ Li$^+$, wherein x ranges from 0 to 2, R is any element or organic group, and the anion is selected from the group consisting of $PF_5^-$, $BF_3^-$, bis(trifluoromethane sulfonyl)imide (TFSI$^-$), bis (fluorosulfonyl)imide (FSI$^-$), and fluorine-malonato (difluoro)borate ((F)MDFB$^-$),
   wherein the fluorinated chlorosilane is represented by a formula ($CH_3$)$_x$SiCl$_y$—($CH_2$)$_m$—($CF_2$)$_n$—$CF_3$, wherein x is 1 and y is 2 or x is 2 and y is 1, m ranges from 0 to 2, and n ranges from 1 to 20,
   wherein the fluorinated methoxysilane is selected from the group consisting of:

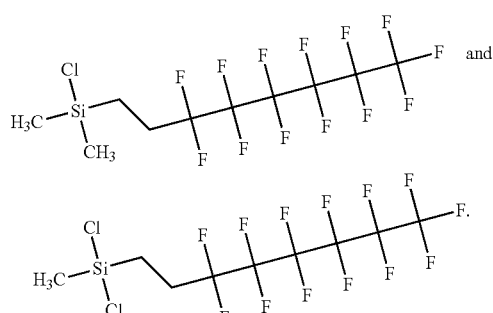

2. The electrolyte as defined in claim 1 wherein the fluorinated chlorosilane is selected from the group consisting of:

3. The electrolyte as defined in claim 1 wherein:
   the solvent is selected from the group consisting of ethylene carbonate, propylene carbonate, butylene carbonate, fluoroethylene carbonate, dimethyl carbonate, diethyl carbonate, ethylmethyl carbonate, methyl formate, methyl acetate, methyl propionate, γ-butyrolactone, γ-valerolactone, 1,2-dimethoxyethane, 1,2-diethoxyethane, ethoxymethoxyethane, tetrahydrofuran, 2-methyltetrahydrofuran, 1,3-dioxolane, dimethoxyethane, tetrahydrofuran, 2-methyltetrahydrofuran, 1,2-diethoxyethane, ethoxymethoxyethane, tetraethylene glycol dimethyl ether (TEGDME), polyethylene glycol dimethyl ether (PEGDME), and mixtures thereof; and
   the lithium salt is selected from the group consisting of lithium bis(trifluoromethylsulfonyl)imide (LiN($CF_3SO_2$)$_2$ or LiTFSI), LiNO$_3$, LiPF$_6$, LiBF$_4$, LiI, LiBr, LiSCN, LiClO$_4$, LiAlCl$_4$, LiB($C_2O_4$)$_2$ (LiBOB), LiB ($C_6H_5$)$_4$, LiBF$_2$($C_2O_4$) (LiODFB), LiN(SO$_2$F)$_2$ (LiFSI), LiPF$_3$($C_2F_5$)$_3$ (LiFAP), LiPF$_4$($CF_3$)$_2$, LiPF$_4$ ($C_2O_4$) (LiFOP), LiPF$_3$($CF_3$)$_3$, LiSO$_3$CF$_3$, LiCF$_3$SO$_3$, LiAsF$_6$, and combinations thereof.

4. A negative electrode structure, comprising:
   a negative electrode including lithium as an active material; and
   a solid electrolyte interface (SEI) layer formed on a surface of the negative electrode, the SEI layer formed from a silane with at least one Si—H group; a fluorinated methoxysilane; a fluorinated chlorosilane; and combinations thereof,
   wherein the silane with at least one Si—H group is selected from the group consisting of H—Si(($CH_2$)$_x$ $CH_3$)$_2$—R-Anion$^-$ Li$^+$ and H—Si(($CH_2$)$_x$$CH_3$)$_2$—O—R-Anion$^-$ Li$^+$, wherein x ranges from 0 to 2, R is any element or organic group, and the anion is selected from the group consisting of $PF_5^-$, $BF_3^-$, bis(trifluoromethane sulfonyl)imide (TFSI$^-$), bis (fluorosulfonyl)imide (FSI$^-$), and fluorine-malonato (difluoro)borate ((F)MDFB$^-$), wherein the fluorinated chlorosilane is represented by a formula $(CH_3)_xSiCl_y-(CH_2)_m-(CF_2)_n-CF_3$, where x is 1 and y is 2 or x is 2 and y is 1, m ranges from 0 to 2, and n ranges from 1 to 20, and wherein the fluorinated methoxysilane is selected from the group consisting of:

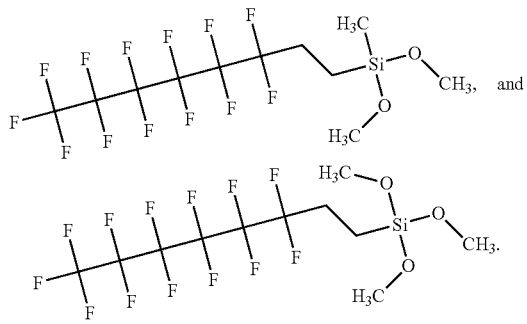

5. The negative electrode structure as defined in claim 4 wherein the fluorinated chlorosilane is selected from the group consisting of:

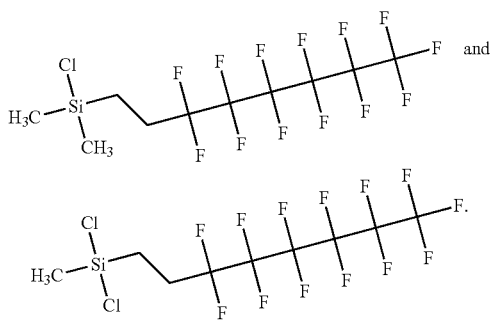

6. A method for making a solid electrolyte interface (SEI) layer on a surface of a lithium electrode, the method comprising:

exposing the lithium electrode to an electrolyte including:
  a solvent;
  a lithium salt; and
  an additive selected from the group consisting of a silane with at least one Si—H group; a fluorinated methoxysilane; a fluorinated chlorosilane; and combinations thereof,
    wherein the silane with at least one Si—H group is selected from the group consisting of H—Si$((CH_2)_xCH_3)_2$—R-Anion$^-$ Li$^+$ and H—Si$((CH_2)_xCH_3)_2$—O—R-Anion$^-$ Li$^+$, wherein x ranges from 0 to 2, R is any element or organic group, and the anion is selected from the group consisting of $PF_5^-$, $BF_3^-$, bis(trifluoromethane sulfonyl)imide (TFSI$^-$), bis(fluorosulfonyl)imide (FSI$^-$), and fluorine-malonato(difluoro)borate ((F)MDFB$^-$),
    wherein the fluorinated chlorosilane is represented by a formula $(CH_3)_xSiCl_y-(CH_2)_m-(CF_2)_n-CF_3$, wherein x is 1 and y is 2 or x is 2 and y is 1, m ranges from 0 to 2, and n ranges from 1 to 20, and wherein the fluorinated methoxysilane is selected from the group consisting of:

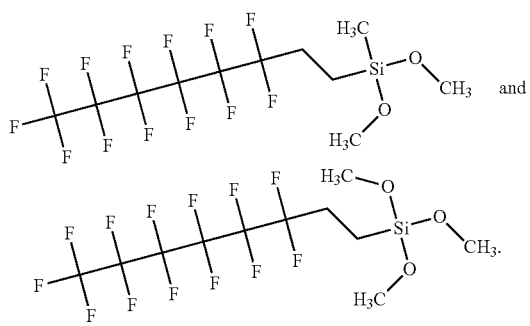

7. The method as defined in claim 6 wherein the lithium electrode is exposed to the electrolyte in an electrochemical cell, and wherein the method further comprises applying a voltage to the electrochemical cell.

8. The method as defined in claim 7 wherein the electrochemical cell is a Li—Li symmetrical electrochemical cell, and the electrolyte solvent is selected from the group consisting of 1,3-dioxolane (DOL or DIOX), dimethoxyethane (DME), tetrahydrofuran, 2-methyltetrahydrofuran, 1,2-diethoxyethane, ethoxymethoxyethane, tetraethylene glycol dimethyl ether (TEGDME), polyethylene glycol dimethyl ether (PEGDME), ethylene carbonate (EC), propylene carbonate, butylene carbonate, fluoroethylene carbonate, dimethyl carbonate (DMC), diethyl carbonate (DEC), ethylmethyl carbonate (EMC), methyl formate, methyl acetate, methyl propionate, γ-butyrolactone, γ-valerolactone, and mixtures thereof.

9. The method as defined in claim 7 wherein the electrochemical cell is a Li—S electrochemical cell, and the electrolyte solvent is selected from the group consisting of 1,3-dioxolane (DOL), dimethoxyethane (DME), tetrahydrofuran, 2-methyltetrahydrofuran, 1,2-diethoxyethane, ethoxymethoxyethane, tetraethylene glycol dimethyl ether (TEGDME), polyethylene glycol dimethyl ether (PEGDME), and mixtures thereof.

10. The method as defined in claim 7 wherein the electrochemical cell is a lithium ion battery, and the electrolyte solvent is selected from the group consisting of ethylene carbonate (EC), propylene carbonate, butylene carbonate, fluoroethylene carbonate, dimethyl carbonate (DMC), diethyl carbonate (DEC), ethylmethyl carbonate (EMC), methyl formate, methyl acetate, methyl propionate, γ-butyrolactone, γ-valerolactone, 1,2-dimethoxyethane, 1,2-diethoxyethane, ethoxymethoxyethane, tetrahydrofuran, 2-methyltetrahydrofuran, and mixtures thereof.

11. The method as defined in claim 6 wherein the lithium electrode is exposed to the electrolyte outside of an electrochemical cell and wherein the electrolyte solvent is selected from the group consisting of 1,3-dioxolane (DOL or DIOX), dimethoxyethane (DME), tetrahydrofuran, 2-methyltetrahydrofuran, 1,2-diethoxyethane, ethoxymethoxyethane, tetraethylene glycol dimethyl ether (TEGDME), polyethylene glycol dimethyl ether (PEGDME), ethylene carbonate (EC), propylene carbonate, butylene carbonate, fluoroethylene carbonate, dimethyl carbonate (DMC), diethyl carbonate (DEC), ethylmethyl carbonate (EMC), methyl formate, methyl acetate, methyl propionate, γ-butyrolactone, γ-valerolactone, and mixtures thereof.

12. The method as defined in claim 6 wherein the lithium salt is selected from the group consisting of $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI or lithium bis(trifluoromethylsulfonyl)imide), $LiPF_6$, $LiB(C_2O_4)_2$ (LiBOB), $LiBF_2(C_2O_4)$ (LiODFB), $LiPF_3(C_2F_5)_3$ (LiFAP), $LiPF_4(CF_3)_2$, $LiPF_4(C_2O_4)$ (LiFOP), $LiPF_3(CF_3)_3$, $LiSO_3CF_3$, $LiNO_3$, and mixtures thereof.

13. The electrolyte as defined in claim 1 wherein the R of the silane with at least one Si—H group is $-(CH_2)_2-Si((CH_2)_xCH_3)_3-$, where x is from 0 to 2.

14. The negative electrode structure as defined in claim 4 wherein the R of the silane with at least one Si—H group is $-(CH_2)_2-Si((CH_2)_xCH_3)_3-$, where x is from 0 to 2.

* * * * *